United States Patent
Thwing et al.

(10) Patent No.: US 9,245,163 B2
(45) Date of Patent: Jan. 26, 2016

(54) OPTICAL VELOCITY TRACKING FOR PAINT SPRAY GUN

(75) Inventors: Clinton J. Thwing, Bulverde, TX (US); Jonathan D. Bartlett, San Antonio, TX (US); Erika C. Laiche, San Antonio, TX (US); David L. Jones, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 1093 days.

(21) Appl. No.: 12/719,093

(22) Filed: Mar. 8, 2010

(65) Prior Publication Data

US 2011/0216188 A1 Sep. 8, 2011

(51) Int. Cl.
| | |
|---|---|
| *G06K 9/00* | (2006.01) |
| *B05B 12/08* | (2006.01) |
| *B05B 7/02* | (2006.01) |
| *H04N 7/18* | (2006.01) |

(52) U.S. Cl.
CPC ... *G06K 9/00* (2013.01); *B05B 7/02* (2013.01); *B05B 12/084* (2013.01); *H04N 7/18* (2013.01)

(58) Field of Classification Search
CPC .......... H04N 7/18; G06K 9/00; B05B 12/084; B05B 7/02
USPC ............................ 348/135, 136, 169; 382/141
See application file for complete search history.

(56) References Cited

U.S. PATENT DOCUMENTS

| | | | | |
|---|---|---|---|---|
| 4,492,952 A | * | 1/1985 | Miller | 340/439 |
| 5,951,296 A | * | 9/1999 | Klein | 434/84 |
| 6,078,670 A | * | 6/2000 | Beyer | 381/57 |
| 7,231,063 B2 | * | 6/2007 | Naimark et al. | 382/103 |
| 7,244,464 B2 | * | 7/2007 | Robens et al. | 427/8 |
| 8,037,870 B2 | * | 10/2011 | Saito et al. | 123/492 |
| 8,300,117 B2 | * | 10/2012 | Carter et al. | 348/239 |
| 2008/0125909 A1 | * | 5/2008 | Eickmeyer et al. | 700/250 |
| 2010/0077959 A1 | * | 4/2010 | Treloar et al. | 118/681 |
| 2010/0143089 A1 | * | 6/2010 | Hvass et al. | 414/754 |
| 2013/0323695 A1 | * | 12/2013 | Zboray et al. | 434/219 |

OTHER PUBLICATIONS

Lee et al., "Real-Time Vision-Based Tracking Control of an Unmanned Vehicle", Dec. 1995, Mechatronics, vol. 5, Issue 8, pp. 973-991.*

* cited by examiner

*Primary Examiner* — Behrooz Senfi
*Assistant Examiner* — Maria Vazquez Colon
(74) *Attorney, Agent, or Firm* — Livingston Law Firm

(57) ABSTRACT

A method of tracking and reporting the velocity of a hand-held paint spray gun. The object to be painted is placed in a room having one or more fiducial walls. A camera is installed on the spray gun, with its field of view toward the one or more fiducial walls. As the object is painted, the camera detects fiducials, calculates their current position, and compares current positions to previous locations to determine movement and velocity. The current velocity is compared to a stored target velocity, and audible or visible feedback is provided to the spray gun operator.

16 Claims, 5 Drawing Sheets

OPTICAL VELOCITY TRACKING FOR PAINT SPRAY GUN

GOVERNMENT SUPPORT CLAUSE

This invention was made with U.S. Government support under Contract No. SP4704-97-C-0004, awarded by the U.S. Army. The Government has certain rights in this invention.

TECHNICAL FIELD OF THE INVENTION

This invention relates to optical tracking systems and methods, and more particularly to an optical velocity tracking system and method for a paint spray gun.

BACKGROUND OF THE INVENTION

Paint spray guns are indispensible for large painting projects. Their use permits any object to be painted faster and without brushmarks. Paint spray systems use varying methods to atomize the paint (or other coating product), and allow for quick and even application of paint to the surface of the object to be painted.

When using a paint spray gun, the spraying motion is somewhat of an art in itself. Ideally, the operator moves the gun at a constant velocity back and forth. Experts learn to push the spray button after the gun is up to speed, and to release the button before the end of the stroke. The strokes should be overlapped, wet on wet.

If the spray gun is not properly operated, the result is a messy, unappealing, and ineffective paint job. For example, if the standoff distance is too great or the painting velocity is too fast, the result is inadequate coverage of the surface. If the standoff distance is too close or the painting velocity is too slow, the result is paint runs and wasted paint.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a system and method for tracking and reporting velocity of a hand-held paint spray gun. The spray gun operator is provided with real time feedback of the velocity of the spray gun. This feedback information allows the operator to make immediate corrections of speed, ensuring optimal painting results. Wasted paint is lessened, and an adequate amount of coverage is ensured, while reducing the overall time spent painting.

Figure 1:
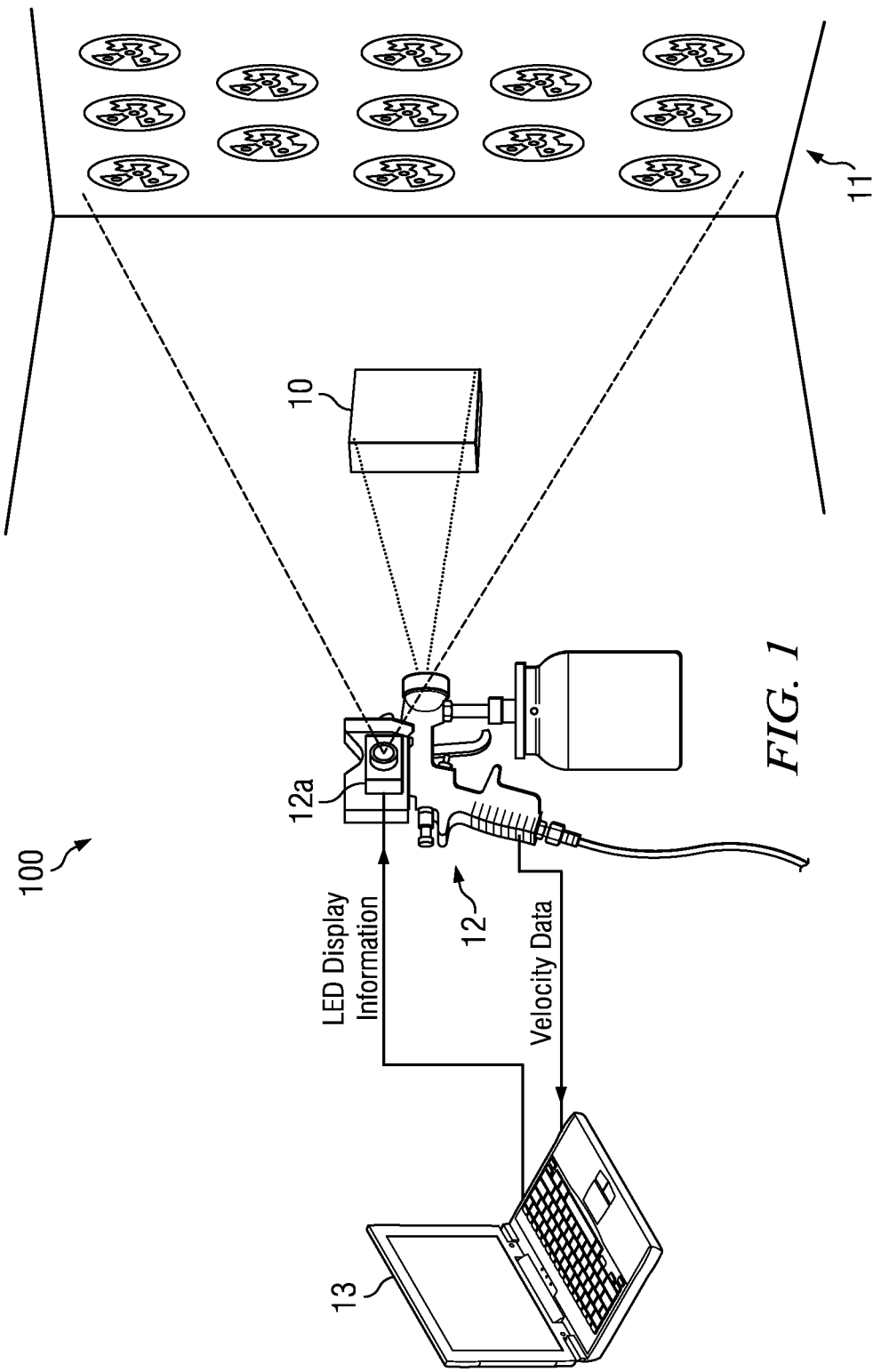
FIG. 1 illustrates the basic concept of the paint spray gun velocity tracking system.

FIG. 1 illustrates the basic concept of a paint spray gun tracking system 100 in accordance with the invention. It should be understood that the term "paint" is used in a broad sense to include any kind of coating that may be sprayed upon the surface of an object, and can include various sealants, primers, etc.

The object 10 to be painted is located in a room having at least one fudicial wall 11. It should be understood that the number of fudicial walls 11 is related to the type of painting (or other coating) being undertaken. For painting a flat surface, a single wall 11 might suffice. However, as explained below, a painting task often involves painting more than one surface of an object, and there will typically be a number of fudicial walls 11.

A camera 12a is mounted on spray gun 12. When spray gun 12 is in use, camera 12a continuously detects fudicials on wall 11. In the example of FIG. 1, the field of view (FOV) of camera 12a is toward wall 11 in a direction generally perpendicular to the direction of spray.

An example of a suitable FOV of camera 12a is 85 degrees. A typical maximum tracking distance is 20× the diameter of a fiducial. Each wall 11 has a minimum of two fiducials. Small fidicials are used for tracking close to wall 11, and larger fidicials are used for tracking further away.

In the example of FIG. 1, camera 12a has an associated processor, and calculates velocity "on board" spray gun 12. The velocity data is delivered to a computer 13, which provides a user interface. As explained below, in other embodiments, the velocity processing may be distributed between camera 12a and computer 13. The data communications between camera 12a and computer 13 may be wired or wireless.

Figure 2:
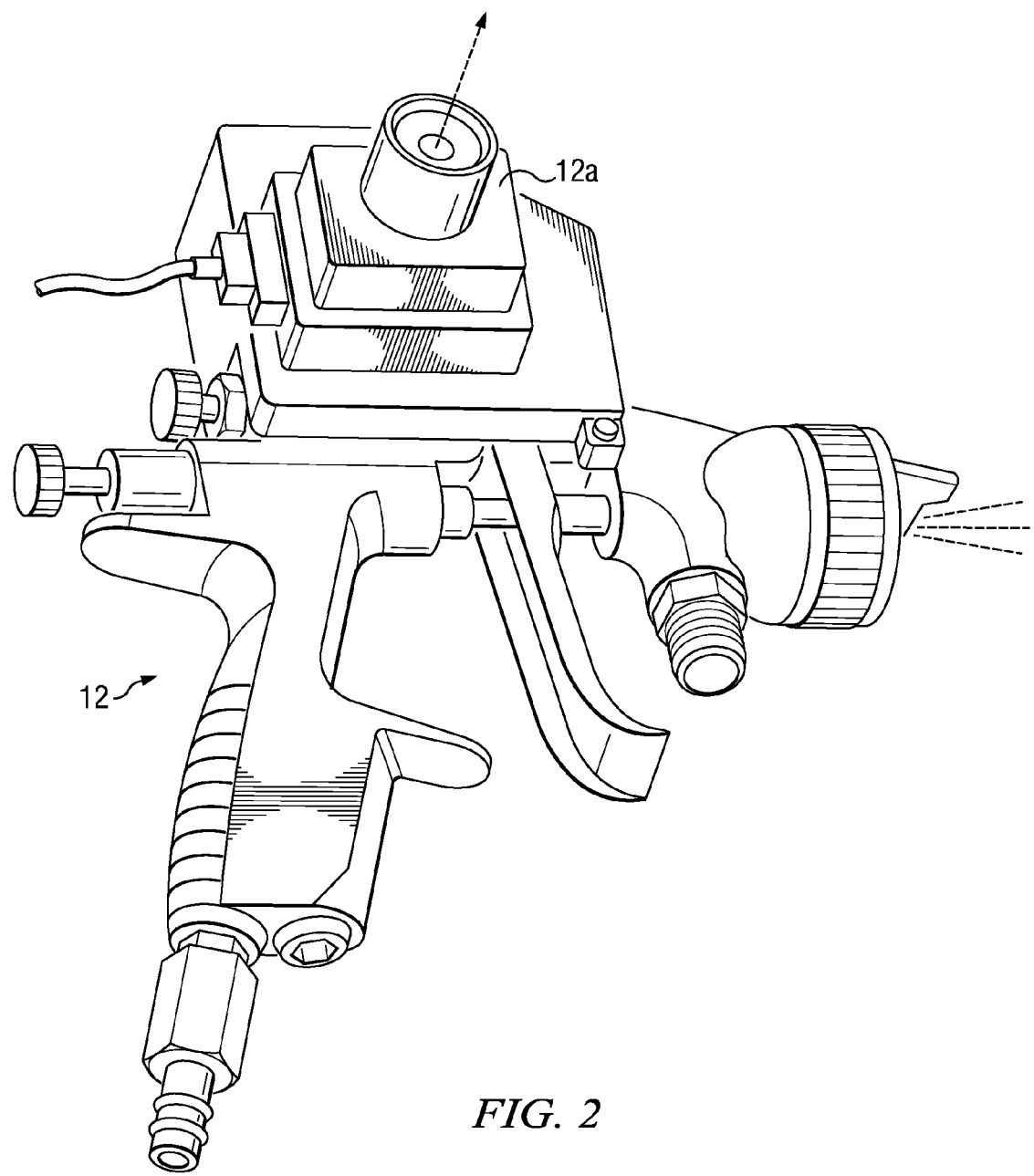
FIG. 2 illustrates an example of a paint spray gun having a camera mounted on it.

FIG. 2 illustrates an example of spray gun 12 having a camera 12a mounted on it. The attachment location of camera 12a on spray gun 12 is important only insofar as camera 12a should have a direct view of wall 11 during painting. Obviously, camera 12a should also be in a location so that it is safe from overspray while gun 12 is in use. In the example of FIG. 2, camera 12a has a field of view to the right of (perpendicular to) the direction of spray. However, the field of view could be some other direction (up, down, behind, in front) so long as there are one or more fiducial walls in the field of view during operation.

Various cameras with compact designs suitable for the present application are commercially available. In general, camera 12a may be any type of optical camera, suitable for mounting on a spray gun 12 without adding undue weight and bulkiness. Camera 12a must also be capable of image speeds sufficient for tracking spray gun motion and providing image data for real time feedback in the manner described herein. As stated above, the distribution of processing between camera 12a and computer 13 is not important to the invention so long as real time velocity computations and operator feedback is provided.

A specific type of suitable camera 12a is an "inertially assisted tracking camera", which has inertial sensors and an integral optical camera, and provides continuous position referencing from the fiducial markers. The result is an accurate 6-DOF (degrees of freedom) tracking device, which combines inertial sensor, camera components, and image processing in one small package. A specific example of such as camera is the InterSense IS-1200 VisTracker, manufactured by Inition of London, England. An advantage of an inertially assisted camera is that the inertial sensors are able to provide redundant tracking data that can be used if the optical tracking data momentarily fails. For example, if the FOV of camera 12a is obstructed, the inertial position tracking can be used instead of optical tracking data for a short period of time.

Referring again to FIG. 1, "fiducials" are markers on wall 11 that are placed so that one or more of them are in the field of view of camera 12a while object 10 is being sprayed. Fiducial images, often referred to as markers, and used for reference in position finding, are known in vision-based tracking systems. Various image designs could be used. A fiducial design can be as simple as small dots in a pattern or as complex as bar-coded images.

The arrangement of fiducials on wall 11 is referred to herein as a "fiducial constellation". In the preferred embodiment, each fiducial is unique in appearance and the fiducials have varying sizes.

Figure 3:
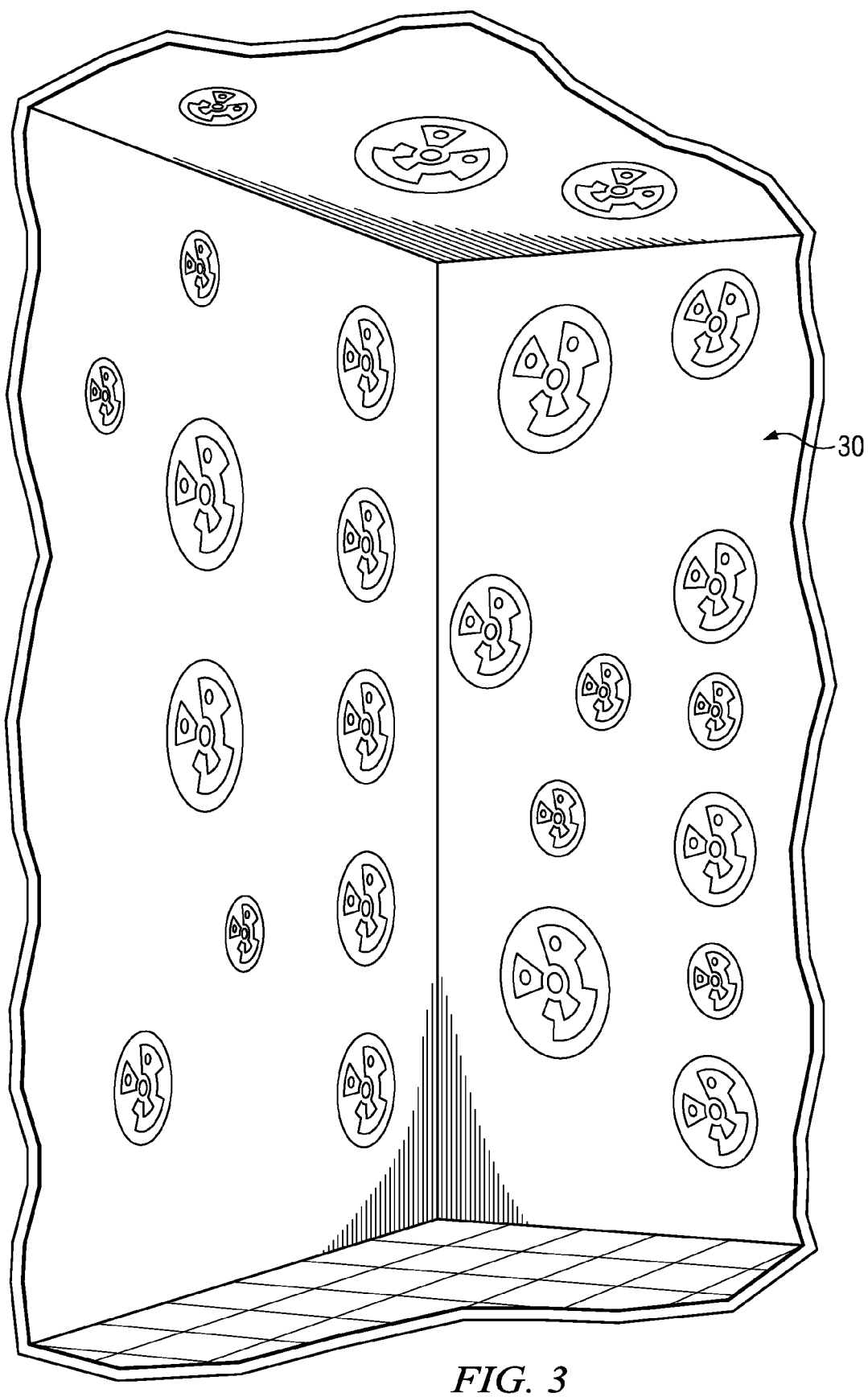
FIG. 3 illustrates a painting room having multiple fiducial walls for painting a three dimensional object.

FIG. 3 illustrates a painting room 30, having multiple fiducial walls for painting a three dimensional object. If all surfaces of an object are to be painted, room 30 could have fiducials on all four walls as well as the floor and ceiling. This would allow the operator to point the spray in any direction without losing optical velocity data. However, depending on the number of surfaces to be painted and various practicalities, it may not be necessary to cover all walls with fiducials. Also, as stated above, an inertially assisted camera can fill in data if fiducials are missing or cannot be detected.

Figure 4:
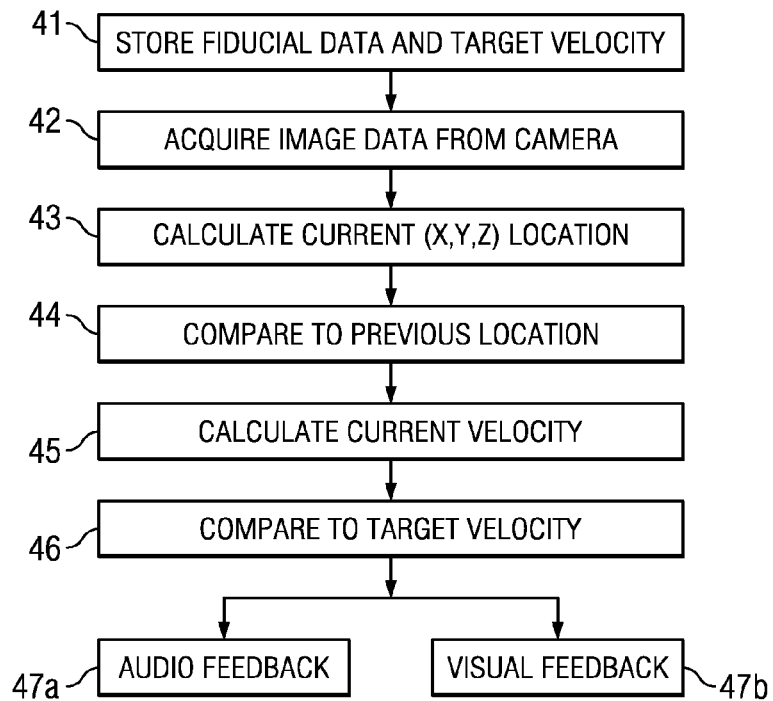
FIG. 4 illustrates a method of tracking spray gun velocity.

FIG. 4 illustrates the method aspects of the invention. In Step 41, as part of a set-up process, the fudicials are located in three-dimensional space (x,y,z). Their positions and diameters relative to a pre-defined origin (0,0,0) are stored in a position matrix in memory of computer 13. Each fiducial has a unique identifier.

A user interface programmed into computer 13 is used to input a target velocity. Velocity thresholds and ranges, such as "optimal", "too slow" and "too fast" speeds, can be determined and stored.

In Step 42, during operation, camera 12a detects fiducials. In Step 43, processing hardware and/or software of camera 12a uses the detection data and the position matrix to calculate the current location of one or more fiducials. In Steps 44 and 45, a fiducial's current location is compared to its previous location, and with time data, the travel distance can be used to determine spray gun velocity.

More specifically, spray gun velocity can be calculated by movement from one fiducial to another or by a change in the detected diameter of a single fiducial. For example, if the spray gun 12 is being moved in a plane normal to the fiducial wall in the camera's field of view, the camera would detect fiducial diameter changes. If the spray gun 12 is moved in a plane parallel to the fiducial wall, the camera would detect movement from one fiducial to another.

Velocity is calculated from a change from one 3-D position to another. One form of result is a 3-D velocity vector whose magnitude of this vector is the basis of the comparison to the target velocity.

Computer 13 also stores target spray gun speed and for optimal paint coverage. These settings are adjustable, and may be "field adjustable" by the spray gun operator.

As stated above, the distribution of processing between on board processing hardware of camera 12a and computer 13 is not important to the invention. In some embodiments, where the tracking programming is not embedded with camera 12a, image data could be delivered to computer 13, which would then use a stored position matrix to determine location and change of position of the spray gun, and to calculate the current spray gun velocity. It is assumed that either or both camera 12a or computer 13 has appropriate hardware and software for these velocity calculations. It is also possible that all data storage, user input, and operator output tasks could be performed by processing and memory of camera 12a, eliminating a separate computer 13.

In Step 46, during painting, the calculated velocity is repeatedly compared to the stored target velocity at predetermined time intervals. In Steps 47a and 47b, a deviation between the target velocity and the measured velocity results in a signal or other feedback to the user. This informs the operator whether the speed of the spray gun is too slow, too fast, or correct.

Figure 5:
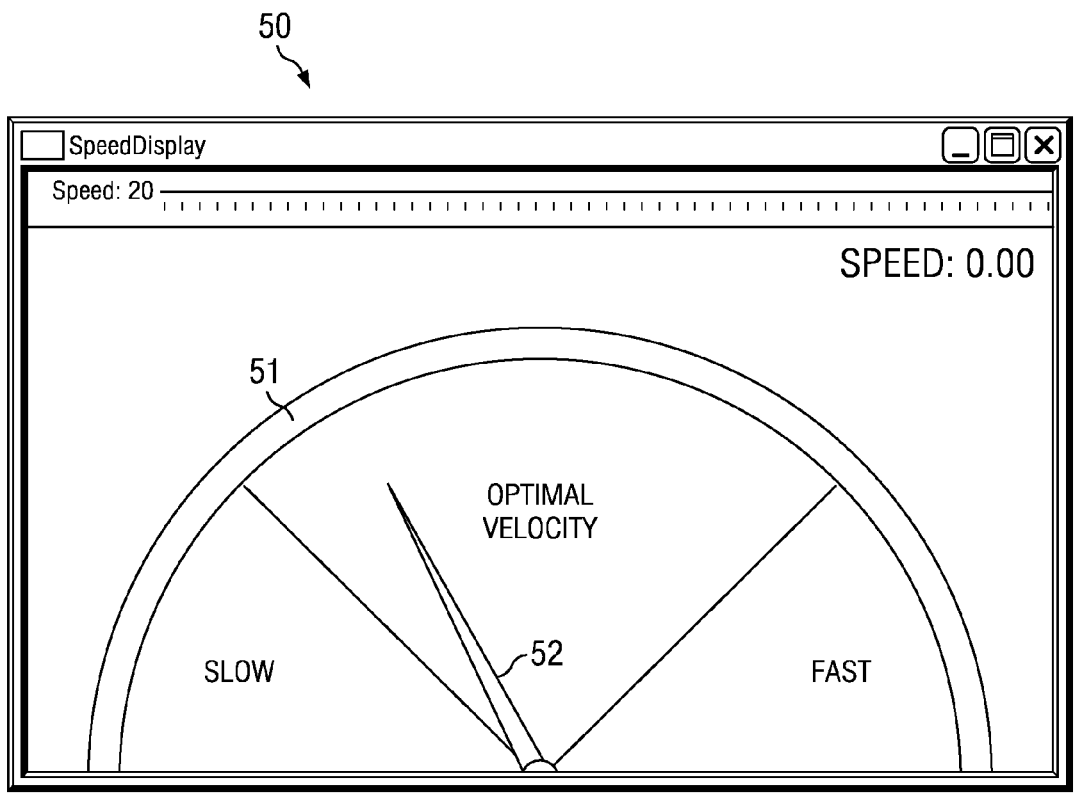
FIG. 5 illustrates one example of a visual velocity reporting feature.

FIG. 5 illustrates one example of a visual velocity reporting feature for system 100. A display screen 50 is displayed on a screen of computer 13 or elsewhere. A semi-circular gauge 51 has three regions. A needle 52 is displayed as moving between regions. When the needle is in the "slow" region to the left, the painting speed is too slow. When the needle is in the "optimal" region in the middle, the spray gun speed is acceptable. When the needle is in the "fast" region to the right, the spray gun speed is too fast.

A second example of velocity reporting is audio tones. A first tone indicates "slow", a second tone "optimal", and a third tone "fast". These tones could be used alone or in conjunction with the display of FIG. 5. For example, a tone of 500 Hz could be used for "slow", 1000 Hz for "optimal", and 1500 Hz for "fast".

Figure 6:
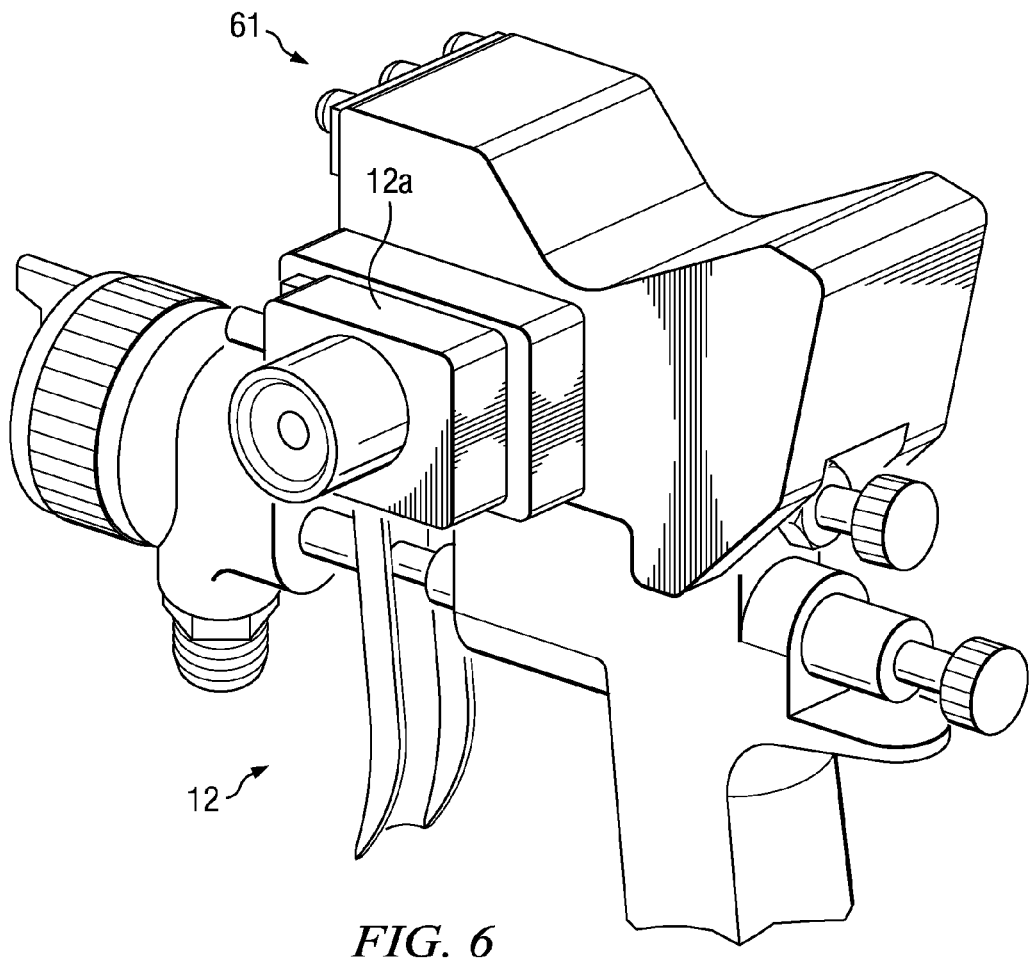
FIG. 6 illustrates another example of a visual velocity reporting feature.

FIG. 6 illustrates another example of a visual velocity reporting feature, which again, could be used alone or in conjunction with one or more other velocity reporting features. In FIG. 6, an LED display 61 is mounted on spray gun 12. Each LED is a different color, with one each representing a spray gun velocity range of "slow", "optimal" or "fast".

In the embodiment of FIG. 6, display 61 faces the direction of spray and the object to be painted. This results in the spray and/or object being illuminated with whatever LED represents the current velocity. However, any convenient location on housing 12 or camera 12a, so that either the LEDs themselves or their illumination is visible to the spray gun operator during painting, could be used.

Figure 7:
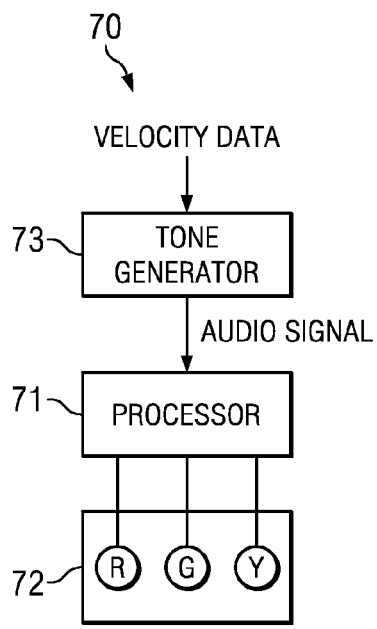
FIG. 7 illustrates circuitry for using an audio signal as input to LED activation, for both audio and visual velocity reporting.

FIG. 7 illustrates how electronic circuitry 70 may be used to receive the above-described audio tones as input for LED activation. As described above, camera 12a (or computer 13) calculates the current velocity of the spray gun and compares the current velocity to a target velocity. It may then categorize the current velocity as being within a predetermined "slow", "optimal", or "fast" range. Depending on the range in which the current velocity falls, an audible tone in one of three frequencies is activated by tone generator 73. This audio signal is delivered to processor 71, which decodes the signal and delivers a signal to the appropriate color of LED on LED circuit 72. A velocity reporting feature such as that illustrated in FIG. 7 might be particularly appropriate for an embodiment in which all velocity tracking and reporting processing is performed by a camera-processor unit mounted on spray gun 12.

What is claimed is:

1. A method of tracking velocity of a hand-held paint spray gun operated by a human during actual painting of an object, comprising:
    placing the object to be painted in an area having at least one wall covered with a constellation of fiducials;
    storing the three-dimensional location and diameter of each fiducial in memory of a computer;
    storing a target velocity value in the memory;
    placing a camera on the spray gun, the camera having a field of view of the at least one wall when the object is being painted;

painting the object using the spray gun by motion of the human hand;

wherein the field of view of the camera is perpendicular to, or in an opposite direction from, a direction of spray during the painting step;

during painting, using the camera to acquire location and diameter data representing the location and diameter of one or more fiducials within the camera's field of view;

using the location or diameter data to determine a current velocity of the spray gun;

comparing current velocity values to the stored target velocity value; and providing feedback, audio or visual, to the operator representing a relationship of the current velocity to the target velocity value.

2. The method of claim 1, wherein the camera is an all optical camera, and the location and diameter data are derived from optical image data.

3. The method of claim 1, wherein the camera is an inertially assisted camera and the location and diameter data are derived in part from inertial measurement data.

4. The method of claim 1, wherein the field of view of the camera is in a direction perpendicular to the direction of spray of the spray gun.

5. The method of claim 1, wherein the step of providing feedback is performed by providing an audio signal whose frequency represents speed.

6. The method of claim 1, wherein the step of providing feedback is performed by activating one or more LEDs.

7. The method of claim 6, wherein the LEDs are located so as to illuminate the paint spray.

8. The method of claim 1, wherein the step of providing feedback is performed by a display of a gauge and needle.

9. A camera-processor velocity tracking device for mounting on a hand-held paint spray gun operated by a human, for use in painting an object in an area having at least one wall covered with a constellation of fiducials, comprising:

a memory for storing a three-dimensional location and diameter of each fiducial and a target velocity value;

a camera having a field of view of the at least one wall when the object is being painted;

wherein the field of view of the camera is perpendicular to, or in an opposite direction from, a direction of spray during painting;

a processor programmed to acquire location and diameter data representing the location and diameter of one or more fiducials within the camera's field of view during painting of the object by motion of the human hand; to use the location or diameter data to determine a current velocity of the spray gun; to compare current velocity values to the stored target velocity value; and an audio or visual feedback unit for providing feedback, audio or visual, to an operator representing a relationship of the current velocity to the target velocity value.

10. The device of claim 9, wherein the camera is an all optical camera, and the location and diameter data are derived from optical image data.

11. The device of claim 9, wherein the camera is an inertially assisted camera and the location and diameter data are derived in part from inertial measurement data.

12. The device of claim 9, wherein the field of view of the camera is in a direction perpendicular to the direction of spray of the spray gun.

13. The device of claim 9, wherein the feedback unit provides an audio signal whose frequency represents speed.

14. The device of claim 9, wherein the feedback unit is one or more LEDs.

15. The device of claim 14, wherein the LEDs are mounted such that they illuminate the paint spray.

16. The device of claim 9, wherein the feedback unit is a display of a gauge and needle.

\* \* \* \* \*